US006957220B2

(12) United States Patent
Lamkin et al.

(10) Patent No.: US 6,957,220 B2
(45) Date of Patent: Oct. 18, 2005

(54) SYSTEM, METHOD AND ARTICLE OF MANUFACTURE FOR TRACKING AND SUPPORTING THE DISTRIBUTION OF CONTENT ELECTRONICALLY

(75) Inventors: Allan B. Lamkin, San Diego, CA (US); Todd R. Collart, Santa Clara, CA (US)

(73) Assignee: Research Investment Networks, Inc., Irvine, CA (US)

( * ) Notice: Subject to any disclaimer, the term of this patent is extended or adjusted under 35 U.S.C. 154(b) by 364 days.

(21) Appl. No.: 10/010,078

(22) Filed: Nov. 2, 2001

(65) Prior Publication Data

US 2003/0009468 A1 Jan. 9, 2003

Related U.S. Application Data

(60) Provisional application No. 60/246,652, filed on Nov. 7, 2000.

(51) Int. Cl.$^7$ ............................................... G06F 17/30
(52) U.S. Cl. ..................... 707/100; 707/102; 707/10; 709/203; 705/35
(58) Field of Search ................ 707/1, 100, 9, 707/10, 102; 705/10–27, 35, 36, 37, 38; 709/203

(56) References Cited

U.S. PATENT DOCUMENTS

| | | | |
|---|---|---|---|
| 4,658,093 A | 4/1987 | Hellman | 705/52 |
| 4,709,813 A | 12/1987 | Wildt | 206/308.2 |
| 4,710,754 A | 12/1987 | Montean | 340/572.6 |
| 4,967,185 A | 10/1990 | Montean | 340/572.3 |
| 5,023,907 A | 6/1991 | Johnson et al. | 710/200 |

(Continued)

FOREIGN PATENT DOCUMENTS

| | | |
|---|---|---|
| EP | 372716 | 6/1990 |
| EP | 762422 | 8/1996 |
| EP | 809244 | 11/1997 |
| EP | 814419 | 12/1997 |

(Continued)

OTHER PUBLICATIONS

Active Video Watching Using Annotation, by Nuno Correia and Teres Chambel, ACM Digital Library, International Multimedia Conference, Oct. 30–Nov. 5, 1999, in Orlando, Florida.

No Modem Needed: TV Signals Bring the Web to Your PC by Michael S. Lasky, Computing Storypage, CNN IDG.net, May 21, 1998.

Mascha M et al: "Interactive education: Transitioning CD–ROMS to the Web "Computer Networks and ISDN Systems, NL, North Holland Publishing, Amsterdam, vol. 27, No. 2, Nov. 1, 1994, pp. 267 through 272.

*Primary Examiner*—Greta Robinson
*Assistant Examiner*—Cheryl Lewis
(74) *Attorney, Agent, or Firm*—Keiji Masaki; Steve A. Wong; Caroline Do

(57) ABSTRACT

A content tracking system consists of a multi-level distributor network including a primary level distributor and a second level distributor for distributing content embodied in a storage medium. A server is included for receiving a tracking identifier that is incorporated with the content embodied in the storage medium and for receiving registration information from the primary level distributor and the second level distributor. The content tracking system includes a database for associating the particular content with the primary level distributor and the second level distributor and for associating transactions derived from the content on the storage medium with the primary level distributor and the second level distributor. The content tracking system is capable providing credit to the primary distributor and the second level distributor for transactions derived from the content after being distributed by the second level distributor.

20 Claims, 4 Drawing Sheets

U.S. PATENT DOCUMENTS

| | | | |
|---|---|---|---|
| 5,128,752 A | 7/1992 | Von Kohorn | 705/10 |
| 5,305,195 A | 4/1994 | Murphy | 705/1 |
| 5,305,197 A | 4/1994 | Axler et al. | 705/14 |
| 5,347,508 A | 9/1994 | Montbriand et al. | 369/273 |
| 5,353,218 A | 10/1994 | De Lapa et al. | 705/14 |
| 5,410,343 A | 4/1995 | Coddington et al. | 725/99 |
| 5,413,383 A | 5/1995 | Laurash et al. | 283/79 |
| 5,420,403 A | 5/1995 | Allum et al. | 235/375 |
| 5,483,658 A | 1/1996 | Grube et al. | 713/200 |
| 5,509,074 A | 4/1996 | Choudhury et al. | 713/176 |
| 5,568,275 A | 10/1996 | Norton et al. | 386/52 |
| 5,651,064 A | 7/1997 | Newell | 705/51 |
| 5,673,195 A | 9/1997 | Schwartz et al. | 700/115 |
| 5,696,898 A | 12/1997 | Baker et al. | 713/201 |
| 5,734,719 A | 3/1998 | Tsevdos et al. | 700/234 |
| 5,751,672 A | 5/1998 | Yankowski | 709/238 |
| 5,802,294 A | 9/1998 | Ludwig et al. | 709/204 |
| 5,804,810 A | 9/1998 | Woolley et al. | 235/492 |
| 5,812,661 A | 9/1998 | Akiyama et al. | 705/52 |
| 5,822,291 A | 10/1998 | Brindze et al. | 369/94 |
| 5,857,021 A | 1/1999 | Kataoka et al. | 705/54 |
| 5,860,068 A | 1/1999 | Cook | 705/26 |
| 5,869,819 A | 2/1999 | Knowles et al. | 235/375 |
| 5,878,020 A | 3/1999 | Takahashi | 369/59.25 |
| 5,892,825 A | 4/1999 | Mages et al. | 705/51 |
| 5,892,900 A | 4/1999 | Ginter et al. | 713/200 |
| 5,892,908 A | 4/1999 | Hughes et al. | 709/250 |
| 5,893,910 A | 4/1999 | Martineau et al. | 707/10 |
| 5,895,073 A | 4/1999 | Moore | 283/70 |
| 5,899,980 A * | 5/1999 | Wilf et al. | 705/26 |
| 5,905,798 A | 5/1999 | Nerlikar et al. | 705/57 |
| 5,913,210 A * | 6/1999 | Call | 707/4 |
| 5,915,093 A | 6/1999 | Berlin et al. | 709/219 |
| 5,920,694 A | 7/1999 | Carleton et al. | 709/205 |
| 5,930,238 A | 7/1999 | Nguyen | 370/260 |
| 5,930,767 A | 7/1999 | Reber et al. | 705/26 |
| 5,940,504 A | 8/1999 | Griswold | 705/59 |
| 5,950,173 A | 9/1999 | Perkowski | 705/26 |
| 5,960,398 A | 9/1999 | Fuchigami et al. | 704/270 |
| 5,978,773 A | 11/1999 | Hudetz et al. | 705/23 |
| 5,987,464 A | 11/1999 | Schneider | 707/10 |
| 5,987,525 A | 11/1999 | Roberts et al. | 705/248 |
| 5,991,798 A | 11/1999 | Ozaki et al. | 709/217 |
| 6,006,328 A | 12/1999 | Drake | 713/200 |
| 6,009,410 A | 12/1999 | LeMole et al. | 705/14 |
| 6,012,071 A | 1/2000 | Krishna et al. | 715/522 |
| 6,016,166 A | 1/2000 | Huang et al. | 348/515 |
| 6,018,768 A | 1/2000 | Ullman et al. | 604/20 |
| 6,025,780 A | 2/2000 | Bowers et al. | 340/572.3 |
| 6,034,937 A | 3/2000 | Kumagai | 369/472.6 |
| 6,035,329 A | 3/2000 | Mages et al. | 709/217 |
| 6,044,403 A | 3/2000 | Gerszberg et al. | 709/225 |
| 6,055,314 A | 4/2000 | Spies et al. | 380/228 |
| 6,061,057 A | 5/2000 | Knowlton et al. | 345/744 |
| 6,064,979 A | 5/2000 | Perkowski | 705/26 |
| 6,073,124 A | 6/2000 | Krishnan et al. | 705/59 |
| 6,076,733 A | 6/2000 | Wilz, Sr. et al. | 235/462.07 |
| 6,081,785 A | 6/2000 | Oshima et al. | 705/1 |
| 6,097,291 A | 8/2000 | Tsai et al. | 340/572.1 |
| 6,097,814 A | 8/2000 | Mochizuki | 380/44 |
| 6,101,180 A | 8/2000 | Donahue et al. | 370/352 |
| 6,128,649 A | 10/2000 | Smith et al. | 709/217 |
| 6,128,652 A | 10/2000 | Toh et al. | 709/219 |
| 6,134,593 A | 10/2000 | Alexander et al. | 709/229 |
| 6,154,738 A | 11/2000 | Call | 707/4 |
| 6,154,773 A | 11/2000 | Roberts et al. | 709/219 |
| 6,161,132 A | 12/2000 | Roberts et al. | 709/219 |
| 6,182,222 B1 | 1/2001 | Oparaji | 713/200 |
| 6,198,875 B1 | 3/2001 | Edenson et al. | 386/94 |
| 6,199,048 B1 | 3/2001 | Hudetz et al. | 705/23 |
| 6,208,805 B1 | 3/2001 | Abecassis | 386/126 |
| 6,226,235 B1 | 5/2001 | Wehmeyer | 707/104.1 |
| 6,246,778 B1 | 6/2001 | Moore | 382/103 |
| 6,298,332 B1 | 10/2001 | Montague | 705/27 |
| 6,415,265 B1 * | 7/2002 | Shell et al. | 705/26 |
| 6,609,101 B1 * | 8/2003 | Landvater | 705/10 |
| 6,633,853 B2 * | 10/2003 | Oshima et al. | 705/57 |

FOREIGN PATENT DOCUMENTS

| | | |
|---|---|---|
| EP | 849734 | 6/1998 |
| EP | 853315 | 7/1998 |
| EP | 802527 | 8/2001 |
| JP | 10063562 | 6/1998 |
| JP | 11039262 | 2/1999 |
| JP | 2000059824 | 2/2000 |
| WO | 88/02960 | 4/1988 |
| WO | 98/47080 | 10/1998 |
| WO | 98/58368 | 12/1998 |
| WO | 99/02385 | 1/1999 |
| WO | 90/08855 | 2/1999 |
| WO | 99/14678 | 3/1999 |
| WO | 99/18054 | 4/1999 |
| WO | 99/24192 | 5/1999 |
| WO | 00/16229 | 3/2000 |

* cited by examiner

SYSTEM, METHOD AND ARTICLE OF MANUFACTURE FOR TRACKING AND SUPPORTING THE DISTRIBUTION OF CONTENT ELECTRONICALLY

This patent document claims priority under 35 U.S.C. § 119(e) to U.S. Provisional Patent Application Ser. No. 60/246,652 filed Nov. 7, 2000, for SYSTEM, METHOD AND ARTICLE OF MANUFACTURE FOR TRACKING USAGE OF LASER-CENTRIC MEDIUM which is incorporated herein by reference.

Related documents, all of which are incorporated herein by reference, are: U.S. application Ser. No. 09/295,688, of Collart, filed Apr. 21, 1999, for SYSTEM, METHOD AND ARTICLE OF MANUFACTURE FOR TARGETTED ADVERTISEMENT BASED ON THE ELECTRONIC CONTENT OF A LASER-CENTRIC MEDIUM; U.S. application Ser. No. 09/295,689, of Collart, filed Apr. 21, 1999, for METHOD AND PROGRAM PRODUCT FOR PREVENTING UNAUTHORIZED USERS FROM USING THE CONTENT OF AN ELECTRONIC STORAGE MEDIUM, now U.S. Pat. No. 6,405,203; U.S. application Ser. No. 09/295,826, of Collart, filed Apr. 21, 1999, for SYSTEM, METHOD AND ARTICLE OF MANUFACTURE FOR THE PURCHASE AND USE OF ELECTRONIC CONTENT UTILIZING A LASER-CENTRIC MEDIUM; U.S. application Ser. No. 09/295,856, of Collart, filed Apr. 21, 1999, for SYSTEM AND METHOD FOR PROVIDING SELECTIVE ACCESS TO DATA ON AN OPTICAL STORAGE MEDIUM; U.S. application Ser. No. 09/295,964, of Collart, filed Apr. 21, 1999 for SYSTEM, METHOD AND ARTICLE OF MANUFACTURE FOR AUTHORIZING THE USE OF ELECTRONIC CONTENT UTILIZING A LASER-CENTRIC MEDIUM AND A NETWORK SERVER, now U.S. Pat. No. 6,665,489; U.S. application Ser. No. 09/296,098, of Collart, filed Apr. 21, 1999, for SYSTEM, METHOD AND ARTICLE OF MANUFACTURE FOR AUTHORIZING THE USE OF ELECTRONIC CONTENT UTILIZING A LASER-CENTRIC MEDIUM, now U.S. Pat. No. 6,453,420; U.S. application Ser. No. 09/296,202, of Collart, filed Apr. 21,1999, for SYSTEM, METHOD AND ARTICLE OF MANUFACTURE FOR INTERACTIVE NETWORK SUPPORT OF INFORMATION BASED ON THE ELECTRONIC CONTENT OF A LASER-CENTRIC MEDIUM; and U.S. application Ser. No. 09/476,190, of Collart, filed Jan. 3, 1999, for SYSTEM, METHOD AND ARTICLE OF MANUFACTURE FOR UPDATING CONTENT STORED ON A PORTABLE STORAGE MEDIUM.

BACKGROUND OF THE INVENTION

1. Field of the Invention

The present invention relates generally to distribution of goods and/or services, and more specifically to accounting within a chain of distribution. Even more specifically, the present invention relates to accounting to successive levels in a multi-level marketing structure.

2. Discussion of the Related Art

Multi-level marketing is a method of sales promotion in which a commission is paid not only to the point of sale distributor that is responsible for making a sale, but also to potentially several levels of distributors that are associated with the point of sale distributor. In a multi-level marketing system, a person acts as both a distributor (moving directly or indirectly products and/or services to others), and as a recruiter (enlisting other persons to distribute the products or services).

A distributor that has enlisted other distributors may be considered a primary distributor that is "up line" with respect to the distributors that they have enlisted. Each distributor enlisted may go on to enlist other distributors so that a chain of distributors is created. Each distributor that is successively enlisted by other distributors within the same chain is "down line" from the primary distributor. Thus, a distribution and recruiting network is created in which a primary distributor has many down line distributors wherein the primary distributor either directly or indirectly assisted in enlisting the down line distributors.

To provide an incentive to distributors so that the distributors are inclined to recruit other distributors, organizations that market in a multi-level structure typically provide a commission to each distributor that is up line from the point of sale distributor. In such a system, the up line distributors, including the primary distributor, typically receive a small piece of the fees collected, in the form of a commission, for the product and/or services distributed. Thus, the primary distributor may receive a commission for each sale made by each distributor that is in their down line.

To assist proper accounting so that each distributor receives their appropriate commission, some organizations utilizing multi-level marketing have allocated a distributor number to each distributor in an existing distribution network so that, e.g., a distributor may distribute product and/or service catalogs (e.g. printed paper catalogs) with their distributor number located thereon to a non-distributor, i.e., a retail consumer, and receive credit for a sale made to the retail consumer ordering from that catalog. In such a system, however, there is no commission type incentive for the retail consumer to further circulate the catalog to other potential purchasers. Thus, much of the marketing power derived from commission based incentives ends when the catalog is placed in a retail consumer's hands.

SUMMARY OF THE INVENTION

In one embodiment, the invention can be characterized as a method for providing a content tracking system including the steps of: generating a tracking identifier, incorporating the tracking identifier with content stored in a storage medium, storing the tracking identifier in a database, providing the storage medium to a primary distributor, receiving information from the primary distributor, associating within the database, in response to the receiving information from the primary distributor, the tracking identifier with the information from the primary distributor, receiving information from a second level distributor, associating within the database, in response to the receiving information from the second level distributor, the tracking identifier with the second level distributor, and providing credit to the primary distributor and the second level distributor in response to a transaction derived from the content on the storage medium.

In another embodiment, the invention can be characterized as a a method of tracking content including the steps of: receiving a tracking identifier that identifies a particular copy of media content, placing the tracking identifier in a database, receiving information from a primary distributor, associating within the database, in response to the receiving information from the primary distributor, the tracking identifier with the information from the primary distributor, receiving information from a second level distributor, and associating within the database, in response to the receiving information from the second level distributor, the tracking identifier with the second level distributor.

In a further embodiment, the invention may be characterized as a content tracking system including a distributor network. The distributor network includes a primary level distributor and a second level distributor for distributing content embodied in a storage medium. A server is included for receiving a tracking identifier that is incorporated with the content embodied in the storage medium. The receiver also receives registration information from the primary level distributor and the second level distributor. Additionally, the content tracking system includes a database for associating the particular content with the primary level distributor and the second level distributor and for associating transactions derived from the content on the storage medium with the primary level distributor and the second level distributor.

In yet another embodiment, the invention may be characterized as a system for tracking content including means for receiving a tracking identifier that identifies a particular copy of media content, and means for placing the tracking identifier in a database. Also included are means for receiving information from a primary distributor, and means for associating within the database, in response to the receiving information from the primary distributor, the tracking identifier with the information from the primary distributor. The system for tracking content also includes means for receiving information from a second level distributor, and means for associating within the tracking identifier database, in response to the receiving information from the second level distributor, the tracking identifier with the second level distributor.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

Figure 1:
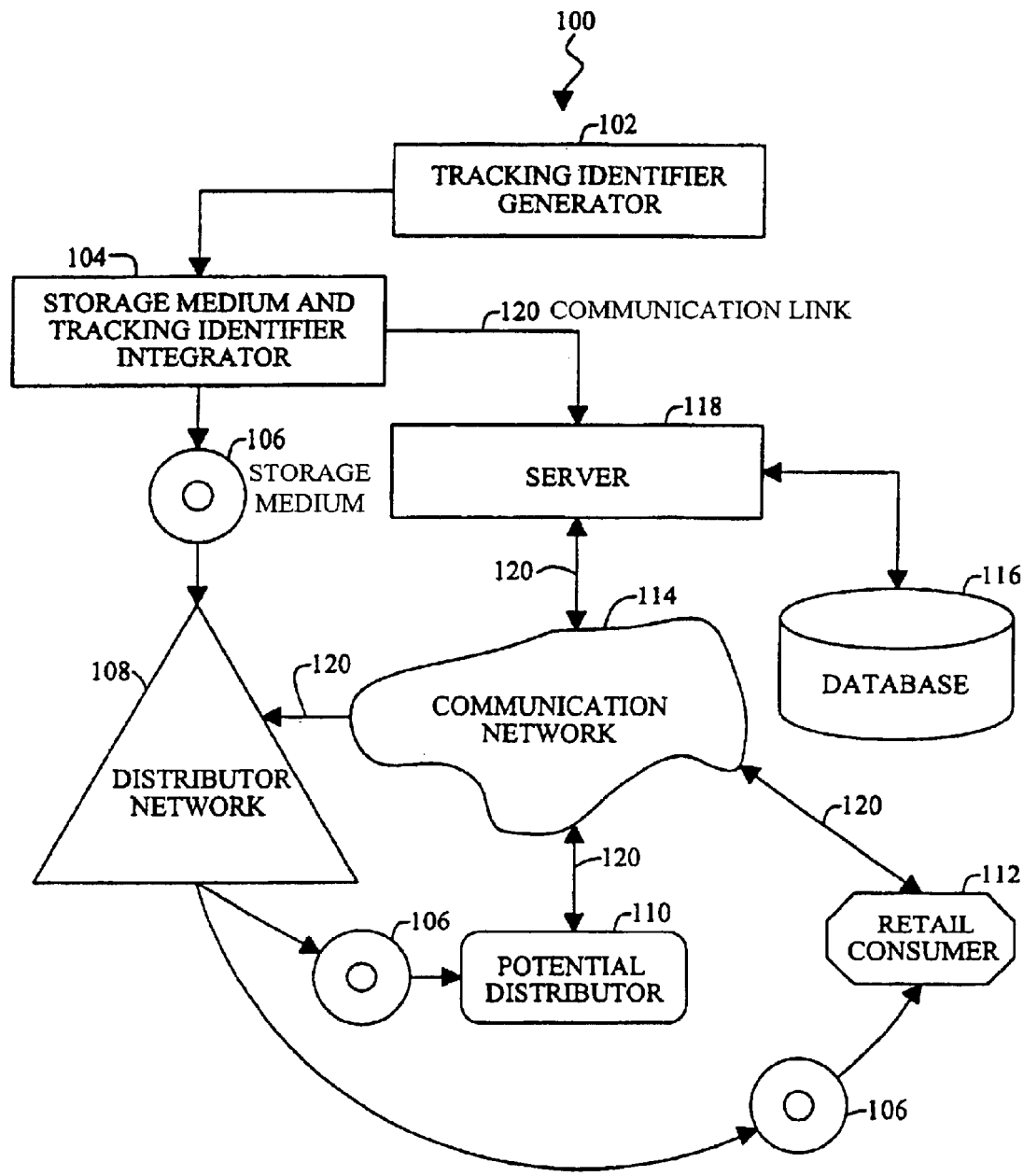
FIG. 1 is a functional block diagram representing components of a content tracking system in accordance with one embodiment of the invention.

Referring first to FIG. 1, is a functional block diagram representing components of a content tracking system 100 in accordance with one embodiment of the invention.

Shown is a tracking identifier generator 102, a storage medium and tracking identifier integrator 104, storage medium 106, a distributor network 108, a potential distributor 110, a retail consumer 112, a communication network 114, a database 116, a server 118, and communication links 120.

The tracking identifier generator 102 is coupled to the storage medium and tracking identifier integrator 104, and the server 118. The storage medium and tracking identifier integrator 104 is coupled to the server 118 via a communication link 120 and provides a storage medium 106 that is received by the distributor network 108. The distributor network 108, the potential distributor 110, and the retail consumer 112 are each coupled to the communication network 114 via separate communication links 120. Several storage medium 106 are shown in distribution paths from the storage medium and tracking identifier integrator 104 to the distributor network 108, from the distributor network 108 to the potential distributor 110, and from the distributor network 108 to the retail consumer 112. The server 118 is coupled to both the communication network 114 and the database 116.

As discussed in further detail with reference to FIG. 2, the distributor network 108 is a network made up of distributors that market products and/or services for one or more organizations that provide the products and/or services.

In practice, the content tracking system 100 allows a marketing organization, e.g., a products and/or services supplier, to market their products and/or services via content, e.g., advertising content, that is distributed through multiple distributors in the distributor network 108. The content distributed in the content tracking system 100 is potentially any type of content that may be distributed over the communication network 114 (e.g., the Internet), or storage medium (e.g., optical disk) including, without limitation, a sales catalog, software package, and video, audio, or graphic art clips. This content may be a designed to give a potential purchaser an abridged version of the actual product for sale. For example, the content may be a brief video clip of a full length motion picture for sale. Similarly, the content may be a "thumbnail" image (an image reduced in resolution and size) of a complete piece of art that is for sale. Likewise, the content may be a version of software with limited functionality intended to attract licensees of a full function version.

The content tracking system 100 further enables the marketing organization to automatically credit distributors that participated in a distribution that led to a sale, license, lease and/or recruitment of a potential distributor 110 by tracking the content, via the communication network 114, with a tracking identifier that is associated with a particular copy of the content distributed. In other words, an organization utilizing the content tracking system 100 can market their products and/or services with advertising content distributed through the distributor network 108 while tracking the particular copy of the advertising content and the particular distributors responsible for the activity that led to a transaction, e.g., sale, license, and/or lease, relating to the products and/or services advertised. Additionally, credit may also be given to the distributors when the content distributed leads to a new distributor being added to the distributor network 108.

As an example, in one embodiment, an initial user. i.e., the distributor, potential distributor 110, or retail consumer 112, receives the storage medium 106, e.g., a digital versatile disk (DVD), having a tracking identifier and content from the marketing organization located thereon. When the initial user inserts the storage medium 106 into a computer or Internet connected device, the tracking identifier is read and transmitted to the server 118. If the initial user elects to make a purchase and/or register as a distributor, user information, e.g., the user's name, address and/or e-mail address, is transmitted to the server 118, and the server places, as a record, the initial user information along with the tracking identifier in the database 116. When the initial user forwards the storage medium 106 to a second user, and the second user inserts the storage medium 106 into an Internet connected device, the tracking number is again read and transmitted to the server 118. If the second user elects to make a purchase and/or register as a distributor, the server 118 receives user information from the second user and checks the database 116 to determine whether prior users are associated with the content. In this example, the server 118 locates the record having the tracking identifier and initial user information, and the server 118 credits the initial user for the purchase and/or registration made by the second user. The server also updates the database 118 so that the second user's information is also associated with the tracking identifier in the database 116. In a similar manner, when a third user, having received the storage medium 106 from the second user, elects to make a purchase or register as a distributor after inserting the storage medium 106 in an Internet connected device, the server 118 checks the database 116, and in this example, finds both the initial and seconds users associated with the tracking identifier; thus, allowing the server 118 to provide credit to both the initial and second users for the purchase, and providing incentive to the third user to further disseminate the content on the storage medium 106.

As used herein, the term "distributor" refers generally to those persons that pass along content, but do not necessary handle the products that are the subject matter of the content. For example, a distributor may pass along an electronic catalog or video clip without actually having to handle and/or deliver the product advertised in the catalog or the full-length video from which the clip is taken. In this example, purchasers contact another source, e.g., the organization that supplies the product, and that organization arranges delivery of the advertised product rather than the distributor.

The content tracking system 100 is beneficial to distributors in the distributor network 108 because the particular copy of content distributed by each distributor is tracked automatically after the distributor registers the content with the server 118. As, a result of this content tracking system 100, distributors in the distributor network 108 can receive credit for passing along the content without having to place their name or any other type of distributor identifier (e.g., a distributor number) within the content or on the storage medium 106.

Additionally, the content tracking system 100 allows the marketing organization to enhance the marketing potential inherent with multi-level marketing by providing an immediate incentive to persons receiving the content to become distributors. This incentive is provided by allowing those persons to receive credit, by a simple registration procedure, for passing along the content to other persons (e.g., natural persons and corporate entities) when, e.g., a sale is generated from the content after being passed along, and/or a new distributor is recruited.

Thus, unlike prior art multi-level marketing structures, where a person outside the distributor network has no commission type incentive to become a distributor because the content cannot easily be traced to them, the content tracking system 100 provides ongoing tracking of the distribution path taken by the content by tracking a tracking identifier that is incorporated with the content so that, once a particular person receives the content and registers with the server 118, they may receive credit (which may translate into a commission or other type incentive) for passing along the content.

In operation, the tracking identifier generator 102 creates tracking identifiers that are later placed into the database 116 and incorporated (i.e., associated with) with content that is distributed. These tracking identifiers provide a reference identifier so that only a particular tracking identifier is associated with a particular copy of the distributed content. In other words, the tracking identifier generator 102 generates numerous tracking identifiers that are all different so that when a particular tracking identifier is associated with a particular copy of distributed content, that particular content may be tracked so that the source and path of that particular copy are known.

As is known to one of ordinary skill in the art, software programs are available that, when enabled with a general-purpose computer, generate numerous unique tracking identifiers. These tracking identifiers may take any useable form including numeric (e.g., digital code), alphanumeric, and/or other sequences of characters.

The storage medium and tracking identifier integrator 104 receives the tracking identifier from the tracking identifier generator 102 and incorporates, i.e. associates or relates, the tracking identifier with the content so that the tracking identifier follows the content through the distribution network 120.

In one embodiment, the storage medium and tracking identifier integrator 104 incorporates the tracking number with the content by etching, e.g., by a YAG laser, the tracking identifier into the burst cut area BCA of the storage medium 106 (in this embodiment digital versatile disc DVD) containing the content to be distributed. In this embodiment, the content is associated with the storage medium 106 by its presence within the storage medium 106. Thus, as the storage medium 106 (with the content) is provided to other persons, the tracking identifier moves along with the content.

According to other embodiments, the tracking identifier is incorporated with the content by other means that may be used in instead of or in connection with the tracking identifier in the burst cut area. For example, the tracking identifier may be incorporated into the content by digital watermarking techniques. Digital watermarking, a technique for embedding hidden data in digital content (e.g., video, text, audio and still images), is commonly used to incorporate the holder of digital rights in particular content with the particular content so the holder of rights can prove they were the source of the content. Similarly, a tracking identifier embedded as a watermark in the content provides proof that the content was distributed by one or more distributors. In another embodiment, the tracking identifier is incorporated with content by encrypting the tracking identifier into a hologram on the storage medium 106. In an alternative embodiment, class 2 errors are written to the storage medium in a particular pattern that corresponds to a particular tracking identifier. When later read, the pattern of errors is decoded to identify the particular tracking identifier. In yet another embodiment, the storage medium 106 is configured with more than one session that allows content to reside in one session while another session stores the tracking identifier. For example, Compact Disc Programmable Read Only Memory (CD-PROM) technology is one storage medium 106 that allows a first session to contain the main content and an additional session that may be written later with the tracking identifier. Any media, however, that allows multiple sessions or a rewriteable format can be utilized to add a tracking identifier to the media so that the tracking identifier is incorporated with the content on the media.

While the tracking identifier may be incorporated with the content by various means, the use of this invention is independent of the particular means utilized to incorporate the tracking identifier. Other means of incorporating the tracking identifier with the content are contemplated and well within the scope of the present invention.

After the tracking identifier is incorporated with the content, in one embodiment, the content is provided to the distribution network 120, via the storage medium 106. In operation, the distributor network 108 provides a network with multiple marketing channels wherein distributors may distribute content to retail consumers 112, or may recruit potential distributors 110 to become a distributor themselves. Each distributor in the distributor network 108 has access to the server 118 via the communication network 114, and the distributors are able to distribute content to distributors via either the storage medium 106.

In one embodiment, the storage medium 106 is initially provided to distributors in the distributor network 108 (i.e., those already registered with the marketing organization). In this embodiment, the distributors then either pass along, e.g., by hand or ordinary mail, the storage medium 106 to other distributors, the potential distributor 110 or the retail consumer 112.

In an alternative embodiment, the content may be provided directly to potential distributors 110 or retail consumers 112 without being received by current distributors. In this way, an entirely new distributor network may be formed out of those potential distributors that elect to further disseminate the content. Additionally, retail consumers 112 may be directly targeted by the marketing organization and provided with the content without utilizing a distributor network 108.

When a distributor or potential distributor 110 receives content, they may either elect to purchase, license or lease a product advertised with the content and/or pass the content along. If the distributor or potential distributor 110 elects to pass the content along, and desires to receive credit for purchases and/or new distributors that are derived from subsequent distribution of the content, they register, as discussed with more detail further herein, with a managing organization that manages and maintains the content tracking system 100 by providing registration information via the communication network 114 to the server 118 which stores this registration information in the database 116. For distributors that have already registered with the managing organization, the registration information may include a pre-assigned distributor identifier, e.g., a distributor number, along with the tracking identifier accessed from the storage medium 106 and/or the content. For potential distributors that elect to register with the managing organization, additional information about the distributor, e.g., name, address, telephone number etc., along with the tracking identifier may be provided to the managing organization as part of the registration process. It should be noted that the managing organization that manages and maintains the content tracking system 100 may be the marketing organization that supplies the products and/or services marketed with the content or another related entity that may be affiliated (e.g., by contract, corporate or other business structure) with the marketing organization.

If a user, i.e., the distributor, potential distributor 110, or retail consumer 112, in possession of the storage medium 106 with the content elects to make a purchase or become a licensee of software, in one embodiment, the user connects with the server 118 via the communication network 114, and registers the tracking number with the managing organization while providing sufficient information to receive and pay for the desired products and/or services. During this registration, the tracking identifier read from the storage medium 106, is transmitted to the server 118, and the server 118 updates a record containing the tracking identifier in the database 116 with information about the sale so that the distributor that provided the content to the purchaser is able to receive credit for the purchase or license.

In several embodiments, the process for registering with the managing organization is substantially automated. In this embodiment, the distributors, potential distributors 110 and retail consumers 112 each have a general purpose computer capable of communicating with the communication network 114 (e.g., the Internet), capable of viewing or otherwise using the content, capable of running a registration application that extracts the tracking identifier from either the content or the storage medium 106 and either automatically connects or otherwise facilitates connection with the server 118 via the communication network 114.

As is known to one of ordinary skill in the art, the general purpose computer may be any one of numerous personal computers readily available having client software and other applications installed thereon that enable the personal computer to communicate with the server 118 through the communication links 120. The communication links may include ordinary telephone communication links, part of an Ethernet network, or wireless communication links that are established, for example, by cellular digital packet data (CDPD), or Wireless Access Protocol (WAP). These same personal computers are capable of viewing or using video, still image, audio, game, business application or other software files.

In one embodiment, the registration process is automated in part by a registration application that is automatically launched by a user (i.e., the distributors, potential distributors 110, and/or retail consumers 112) when accessing the content on the purpose computer. When launched, the registration application instructs the personal computer to read the tracking identifier from the storage medium 106, and after the tracking identifier read, the registration software directs the personal computer to connect with the server 118 for communication of the registration information, e.g., the tracking identifier and distributor information. This registration application may be provided along with the content so that the registration application is automatically launched when the content is accessed. Thus, in the present embodiment, when a user receives content and accesses the content with the personal computer, the registration application is launched and the user is connected with the server 118. Once a connection is made with the server 118, the tracking identifier is automatically provided to the server 118 along with any registration information provided by the user. In another embodiment, the registration application may be configured so that the user controls whether the registration with the server 118 occurs or not. In such an embodiment allowing user control of the registration process, the registration application may be provided as a separate file that is launched separately by the user.

The communication network 114 provides means for communications to take place between the server 118 and the distributors, potential distributors 110 and retail consumers 112. It will be apparent to those of ordinary skill in the art that the communication network 114 may be the Internet, a wide area network (WAN), a local area network (LAN) or other combinations of networks that may be linked through gateways, switches, routers and other types of communication linkages.

The server 118 receives the tracking identifier transmitted by users of the content and information about the user of the content. The server 118 then provides the tracking identifier and the information about the user of the content to the database 116 where a record relating the tracking identifier and the user with usage information (e.g., sales or licensing income) is made. As will be appreciated, the server 118 may be built on a personal computer having server software installed thereon. Further detailed description of the components of the server system 118 will not be included herein, it being understood from the descriptions provided herein that those skilled in the art would be able to configure appropriate networks and computing devices to accomplish the principles of this invention as described.

In one embodiment, the database 116 maintains a record for each tracking identifier that includes information about each distributor associated with the tracking identifier. Specifically, the database 116 has a record for each tracking identifier that indicates each distributor in the chain of distribution that distributed and registered the content prior to a sale, lease, license and/or new recruited distributor. Thus, for each sale, lease, license and or newly recruited member, a record in the database 116 exists that identifies each distributor that passed along the content that prompted the sale, lease, license and/or a newly recruited distributor. As a result, credit may be given to each distributor for their role in the sale, lease, license and/or recruitment.

In this way, the database provides a record of all contact made by users of the content so that the particular user need not write their name on the storage medium or attempt to follow the content by other means (e.g. making telephone calls) to receive credit for distributing the content. In other words, unlike prior art multi-level tracking systems which track a particular distributor, the content tracking system 100 tracks the content's contact made with all persons that desire to receive credit as a distributor. In this way, a potential distributor 110 is assured that if they pass along the content to become a distributor they will receive credit with the content tracking system 100. Thus, a commission based incentive (based upon the credit received) is provided to persons coming in contact with the content to pass the content along to others; thus, extending the incentive based marketing power of a multi-level market structure to more persons while providing convenient content tracking means.

Figure 2:
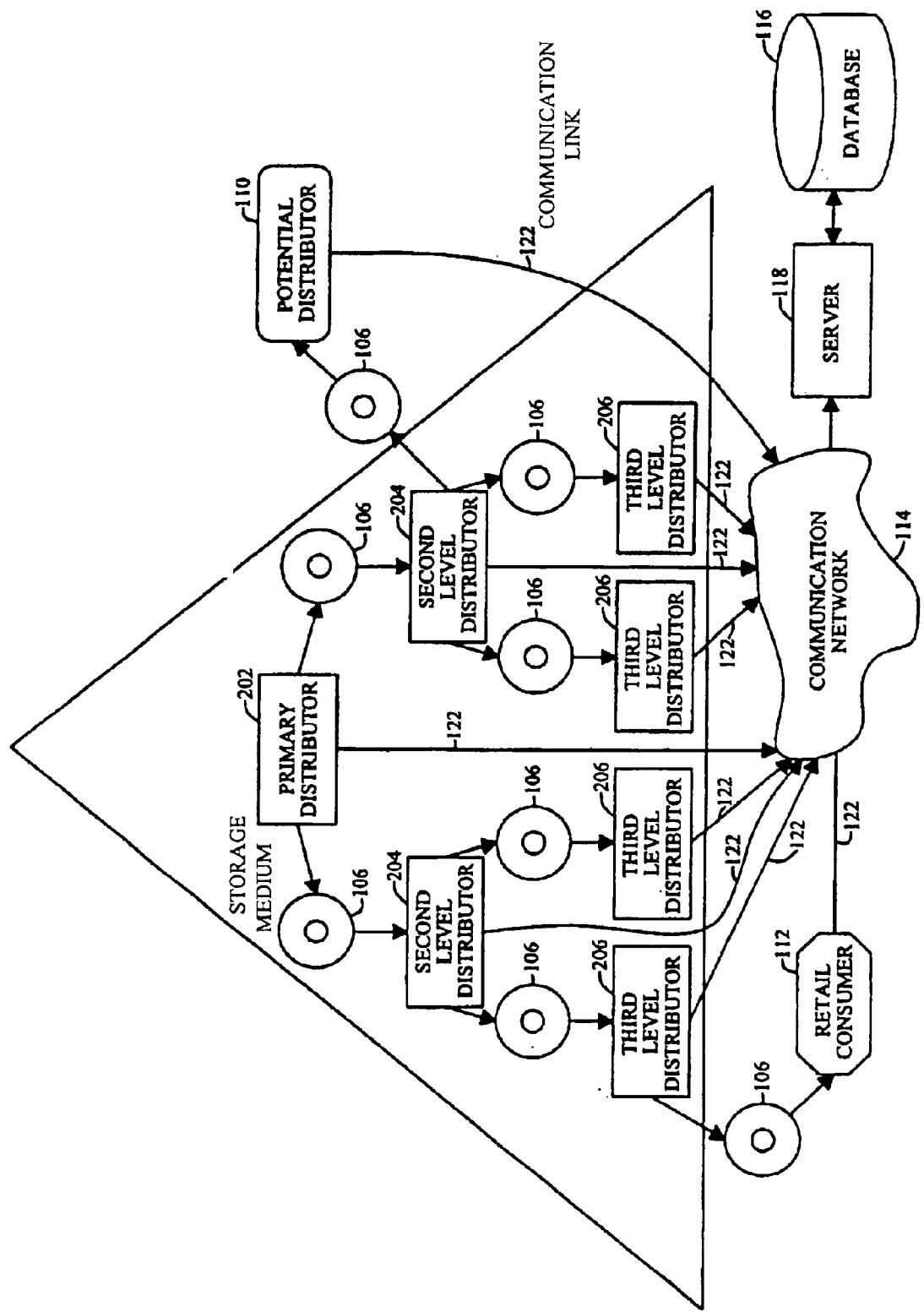
FIG. 2 is a detailed view of one embodiment of the distribution network shown in the embodiment of FIG. 1.

Referring next to FIG. 2, shown is a detailed view of one embodiment of the distribution network 120 of FIG. 1 in which the distributor network 108 is a multi-level distributor network. Shown is the distributor network 108 that includes a primary distributor 202, second level distributors 204, and third level distributors 206. Also shown is the storage medium 106, the potential distributor 110, the retail consumer 112, the communication network 114, the database 116, the server 118 and the communication links 122.

The distributors 202, 204, 206, are shown in a pyramid like arrangement in which the primary distributor 202 is shown at the top of this arrangement with second level distributors 204 below the primary distributor 202, and the third level distributors 206 below the second level distributors 206. Directly below the primary distributor 202 are two second level distributors 204, and directly below each of the two second level distributors 205 are two third level distributors 206. All the distributors 202, 204, 206, are connected to the communication network 114 via communication links 122. The retail consumer 112 and the potential distributor 110 are also connected with the communication network 114 via the communication links 122. The server 118 is connected with the communication network 114 via communication link 122 and is coupled to the database 116. Storage media 106 are shown being distributed from the primary distributor 202 to the second level distributors 204, from the second level distributors 206 to the third level distributors 206. Also shown are storage media 106 being distributed from one of the third level distributors 206 to the retail consumer 112 and from one of the second level distributors 204 to the potential distributor 110.

In the distribution network 108 of FIG. 2, the primary distributor 202, recruited the second level distributors 204 to be distributors within the distribution network 108. In turn, each of the second level distributors 204 recruited two third level distributors 206. In this embodiment, the second 204, third 206, and fourth 208 level distributors are all "down line" from the primary distributor 202, i.e., a line of distributors can be followed up from any one of the distributors that is in the second level or lower to the primary distributor 202. Concomitantly, the primary distributor 202 is "up line" from each of the distributors in second and third levels of the distributor network 108.

It should be noted that the distributor network 108 of FIG. 2 is an exemplary of a multi-level network viewed from the perspective of the primary distributor 202. Thus, in FIG. 2, the levels are numbered in relation to the primary distributor 202. The primary distributor 202, however, may be five levels below another distributor. Thus, the distribution network 108 as shown is representative of a larger distribution network with potentially many more distributors. Additionally, it should be understood that the particular number of distributors shown in this embodiment is merely exemplary and that there may be more or fewer distributors in each of the three distributor levels shown. It should also be noted that the retail consumer 112 and the potential distributor 110 may receive the storage medium 106 from any of the distributors in the distributor network 108.

As is typical with multi-level marketing organizations, the primary distributor 202 may receive credit for any sales generated from within its down line. Thus, for example, the primary distributor 202 in one embodiment receives credit for a purchase made by the retail consumer 112 when the retail consumer 112 makes a purchase using content provided by the one of the third level distributors 206. Advantageously, with the content tracking system 100, once a tracking identifier is incorporated with the content and the primary distributor 202 registers with the server 118 so that the primary distributor 202 is associated with that content, the primary distributor 202 automatically receives credit when the retail consumer 112 makes a purchase using the content. Advantageously, various systems for providing credit to distributors may be implemented within the scope of the present invention because the content tracking system allows for tracking of all users that register with the system. Thus, flexibility is provided to the managing organization to experiment with different incentive mechanisms to achieve optimum profits.

Additionally, the content tracking system 100 provides an additional incentive for a person that is a potential distributor 110 to become a distributor because that potential distributor 110 can simply register with the server to become associated with the tracking identifier incorporated with the content. In one embodiment, once the potential distributor 110 has registered, that potential distributor 110 becomes a distributor within the distribution network 108 and may receive credit for subsequent sales derived from those he distributes the content to.

If the potential distributor 110 does elect to become a distributor, and registers with the managing organization in connection with particular content, the one of the second level distributors 204 that provided the content to the potential distributor 110 receives credit for the recruitment of the potential distributor 110 and credit for subsequent sales, leases, licenses generated by subsequent activity of the once potential distributor. In some embodiments, the primary distributor 202 also receives credit for the potential distributor 110 recruited by the one of the second level distributors 204.

Thus, content may be distributed to non-distributors and each distributor up line can receive credit for future recruits and/or sales, licenses, and or leases that subsequently occur in that distribution path. This provides substantial advantages over prior art multi-level tracking systems where non-distributors could not easily receive credit for further distributing content because the content was only traceable to the distributor that placed his/her distributor number with the content.

Figure 3:
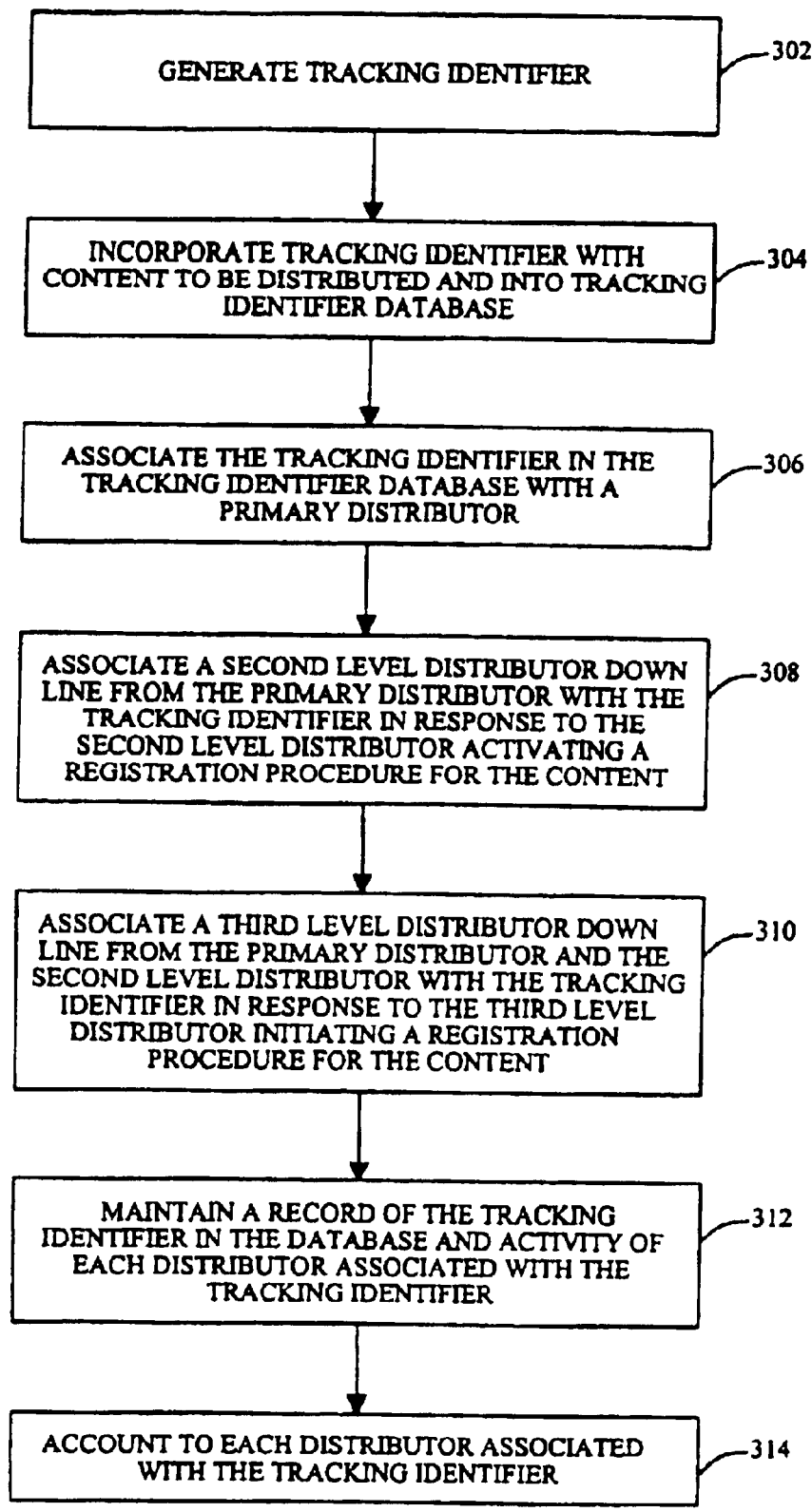
FIG. 3 is a flow chart depicting the steps traversed by the content tracking system of FIG. 1.

Referring next to FIG. 3, shown is a flow chart depicting the steps traversed by the content tracking system of FIG. 1.

In the first step, the tracking identifier generator 102, as discussed with reference to FIG. 1, generates a tracking identifier (Step 302). As discussed, the tracking identifier may take the form of a series of numbers or other characters that may be incorporated with content that is distributed, and stored within the database 116.

Next, the tracking identifier is incorporated with the content by the storage medium and tracking identifier integrator 104, and the tracking identifier is stored in the data base (Step 304). In one embodiment, the tracking identifier is incorporated with the content by placing the tracking identifier on the surface of the storage medium, e.g., by etching the tracking identifier into a burst cut area BCA of the storage medium 106. Alternatively, the tracking identifier is incorporated by other means in the storage medium so as to be readable by a computer.

After the tracking identifier is incorporated with the content and the tracking identifier is stored in the database 116, the content is distributed to the primary distributor 202. After the primary distributor 202 registers the content with the managing organization that operates the server 118, the registration information from the primary distributor 202 is associated with the tracking identifier stored in the database 116 (Step 306). Thus, a record within the database 116 is created that associates the primary distributor 202 with the content.

Next, the tracking identifier in the database is associated with a second level distributor 204 after the second level distributor 204 receives the content from the primary distributor 202 and registers the content (i.e., registers with the managing organization in connection with the content)(Step 308). In the present embodiment, registration information provided by second level distributor 204 is stored in the record containing the tracking identifier and the registration information provided by the primary distributor 202. In the present embodiment, after the secondary distributor 204 is associated with the tracking identifier, the database contains a record that relates both the primary distributor 202 and the second level distributor 204 to the tracking identifier. As a result, if the second level distributor 204 creates a sale, lease or license to the retail consumer 112, the primary distributors receives credit.

Once the content is further distributed to a third level distributor 206 from the second level distributor 204, the third level distributor 206 is associated with the tracking identifier in the database in response to the third level distributor 206 registering the content (Step 310). In the present embodiment, after the third level distributor 206 is associated with the tracking identifier in the database, a record exists that relates the primary distributor 202, the second level distributor 204, and the third level distributor 206 to the tracking identifier. Thus, both the second level distributor 204 and the primary distributor 202 are able to receive credit when the third level distributor 206 creates a sale, license or lease from a retail consumer 112.

Next, the record that relates the primary distributor 202, the second level distributor 204, and the third level distributor 310 to the tracking identifier is maintained and additional activity (e.g., sales and/or further distributor recruitment) is associated with the identifier (Step 314). Thus, when the third level distributor 306 provides the content to the retail consumer 112, and the retail consumer 112 makes a purchase utilizing the content in connection with the registration application, the record that relates the primary distributor 202, the second level distributor 204, and the third level distributor 310 to the tracking identifier is updated to indicate a sale was made in connection with this content.

Periodically an account is made to each distributor associated with the tracking identifier of the activity associated with the content (Step 314). In the present embodiment, the organization management retrieves data and creates reports from the record in the database 116 using either, the same computer that functions as the server 118, or another computer connected with the database 116. Such reports are used to provide credit to each distributor for transactions, e.g., sales, licenses, leases and/or recruitment that were derived from distribution of the content.

Figure 4:
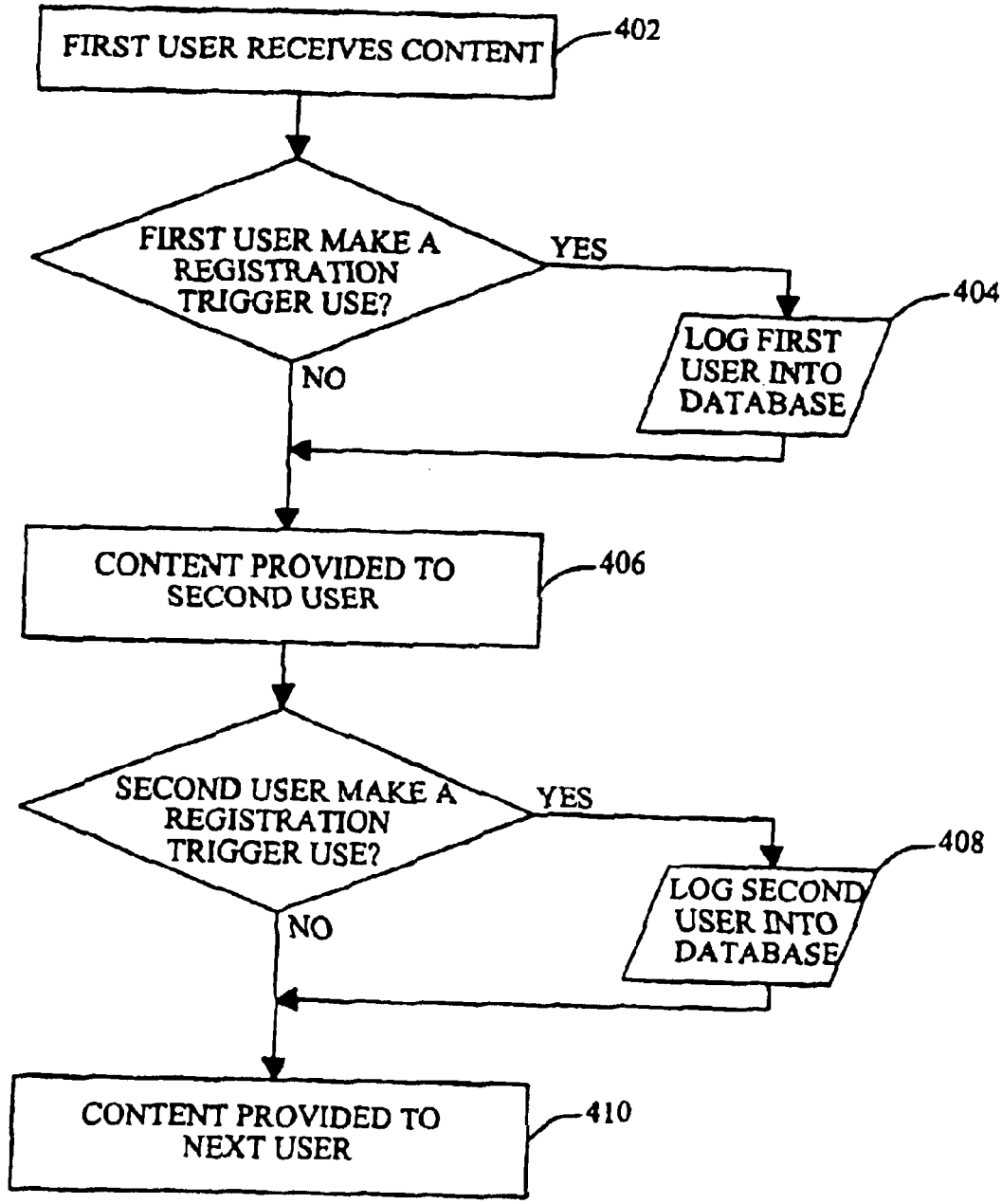
FIG. 4 is a flow chart depicting the steps traversed by the content tracking system of FIG. 1 when associating users of the content with the tracking identifier.

Referring next to FIG. 4, shown is a flow chart depicting the steps traversed by the content tracking system 100 when users of the content are associated with the tracking identifier.

In the first step, a first user receives the content (Step 402). The user may be the retail consumer 112, the potential distributor 110, or one of the distributors in the distributor network 108.

Next, if the first user registers the content, the first user's registration information is logged into the database 116 (Step 404). The registration may be in response to the first user being the potential distributor 110 electing to become a distributor; the existing distributor either making a purchase or registering the content before passing it along; or the retail consumer making a purchase in connection with the content. In each case, information about the first user, e.g., name, address, telephone number, etc., is gathered and related within the database 110 to the tracking identifier incorporated with the content.

Next, the content is provided to a second user (Step 406). The second user may also be the retail consumer 112, the potential distributor 110, or one of the distributors in the distributor network 108. If the second user registers the content, the second user's registration information is logged into the database 116 so that both the first and second user's information are logged into the database 116. The registration made by the second user may also be in response to the second user being the potential distributor 110 electing to become a distributor; the existing distributor either making a purchase or registering the content before passing it along; or the retail consumer making a purchase in connection with the content. In each case, information about the second user, e.g., name, address, telephone number, etc., is gathered and related, in the database 110 to the tracking identifier incorporated with the content.

After the content is logged by the second user, the second user may provide the content to the next user (Step 410). The next user, as with the first and second user, may similarly elect to register to content and become associated with the tracking number of the content.

While the invention herein disclosed has been described by means of specific embodiments and applications thereof, numerous modifications and variations could be made thereto by those skilled in the art without departing from the scope of the invention set forth in the claims.

What is claimed is:

1. A method for providing a content tracking system comprising:

receiving information from a primary distributor, the information being tracked using a tracking identifier on a storage medium, the tracking identifier being stored in a database;

associating within the database, in response to the receiving information from the primary distributor, the tracking identifier with the information from the primary distributor;

receiving information from a second level distributor, the second level distributor being successively enlisted from the primary distributor;

associating within the database, in response to the receiving information from the second level distributor, the tracking identifier with the second level distributor; and providing credit to the primary distributor in response to a transaction derived from the second distributor.

2. The method of claim 1 wherein the transaction derived from the second distributor is selected from the group consisting of a sale, a lease, and a license.

3. The method of claim 1 wherein the tracking identifier is incorporated into a burst cut area of the storage medium.

4. The method of claim 1 further comprising:

receiving information from a third level distributor;

associating within the database, in response to the receiving information from the third level distributor, the tracking identifier with the third level distributor, the second level distributor and the primary distributor; and providing credit to the primary distributor and the second level distributor in response to the transaction derived from the third level distributor.

5. A method of tracking content comprising:

receiving a tracking identifier that identifies a particular copy of content on a storage medium;

placing the tracking identifier in a database;

receiving information from a primary distributor;

associating within the database, in response to the receiving information from the primary distributor, the tracking identifier with the information from the primary distributor;

receiving information from a second level distributor, the second level distributor being successively enlisted from the primary distributor; and associating within the database, in response to the receiving information from the second level distributor, the tracking identifier with the second level distributor.

6. The method of claim 5 further comprising:

crediting the primary distributor in response to a transaction derived from the second level distributor.

7. The method of claim 6 wherein the transaction derived from the second level distributor is selected from the group consisting of a sale, a lease, and a license.

8. The method of claim 5 further comprising:

receiving information from a third level distributor; and associating within the database, in response to the receiving information from the third level distributor, the tracking identifier with the primary distributor, the second level distributor and the third level distributor.

9. The method of claim 8 further comprising:

crediting the primary distributor and the second level distributor, in response to a transaction selected from the group consisting of a sale, a lease, and a license wherein the transaction is derived from the third level distributor.

10. A content tracking system comprising:

a server for receiving a tracking identifier that is incorporated with the content embodied in a storage medium and for receiving registration information from the primary level distributor and the second level distributor of a distributor network; and a database for associating the content with the primary level distributor and the second level distributor and for associating transactions derived from the primary level distributor and the second level distributor, the second level distributor being successively enlisted from the primary distributor.

11. The system of claim 10 wherein credit is provided to the primary level distributor in response to the transaction derived from the second level distributor.

12. The system of claim 11 wherein the transaction derived from the second level distributor is selected from the group consisting of a sale, a lease, and a license.

13. The system of claim 10 further comprising:

a storage medium and tracking identifier integrator for incorporating the tracking identifier with the content embodied in the storage medium.

14. The system of claim 13 further comprising:

a tracking identifier generator for generating the tracking identifier.

15. A system for tracking content comprising:

means for receiving a tracking identifier that identifies a particular copy of media content;

means for placing the tracking identifier in a database;

means for receiving information from a primary distributor;

means for associating within the database, in response to the receiving information from the primary distributor, the tracking identifier with the information from the primary distributor;

means for receiving information from a second level distributor, the second level distributor being successively enlisted from the primary distributor; and means for associating within the tracking identifier database, in response to the receiving information from the second level distributor, the tracking identifier with the second level distributor.

16. The system of claim 15 further comprising means for providing credit to the primary distributor for a transaction derived from the second level distributor.

17. The system of claim 16 wherein the transaction derived from the content is selected from the group consisting of a sale, a lease, and a license.

18. The system of claim 15 comprising:

means for receiving information from a third level distributor; and means for associating within the tracking identifier database, in response to the receiving information from the third level distributor, the tracking identifier with the third level distributor, the second level distributor and the primary distributor.

19. The system of claim 18 further comprising means for providing credit to the primary distributor and the second level distributor for transactions derived from the third level distributor.

20. The system of claim 19 wherein the transaction derived from the third level distributor is selected from the group consisting of a sale, a lease, and a license.

* * * * *

UNITED STATES PATENT AND TRADEMARK OFFICE
CERTIFICATE OF CORRECTION

PATENT NO. : 6,957,220 B2 Page 1 of 1
APPLICATION NO. : 10/010078
DATED : October 18, 2005
INVENTOR(S) : Allan B. Lamkin et al.

It is certified that error appears in the above-identified patent and that said Letters Patent is hereby corrected as shown below:

On Title Page:
Item [73] Assignee:
　　Delete "Networks" and insert --Network-- in place thereof.

Signed and Sealed this

Twenty-eighth Day of August, 2007

JON W. DUDAS
*Director of the United States Patent and Trademark Office*